United States Patent [19]
Letoffé et al.

[11] Patent Number: 4,532,315
[45] Date of Patent: Jul. 30, 1985

[54] RAPIDLY HARDENING ORGANOPOLYSILOXANE COMPOSITIONS COMPRISING POLYACYLOXYSILANE CROSS-LINKING AGENTS

[75] Inventors: Michel Letoffé, Sainte-Foy Les Lyon; Roger Favre; Patrice Perrin, both of Lyons, all of France

[73] Assignee: Rhone-Poulenc Specialites Chimiques, Courbevoie, France

[21] Appl. No.: 573,611

[22] Filed: Jan. 25, 1984

[30] Foreign Application Priority Data

Jan. 27, 1983 [FR] France ............... 83 01504

[51] Int. Cl.$^3$ ............................................. C08G 77/06
[52] U.S. Cl. ........................................ 528/14; 528/34; 528/901; 524/860
[58] Field of Search ................... 528/901, 34, 14; 524/860

[56] References Cited

U.S. PATENT DOCUMENTS 3,061,575 10/1962 Russell ........................... 528/901
3,077,465 2/1963 Bruner ............................ 528/901
3,133,891 5/1964 Ceyzeriat ........................ 528/34
3,382,205 5/1968 Beers .............................. 528/34

FOREIGN PATENT DOCUMENTS 1198749 12/1959 France .
640067 7/1950 United Kingdom .

Primary Examiner—Melvyn I. Marquis
Attorney, Agent, or Firm—Burns, Doane, Swecker & Mathis

[57] ABSTRACT

Organopolysiloxane compositions which rapidly harden to the elastomeric state, even at ambient temperatures, are comprised of (i) a polyhydroxylated polysiloxane, (ii) a polyacyloxysilane cross-linking agent therefor, and (iii) a hardening accelerator comprising an alkali or alkaline earth metal hydroxide. The subject compositions are useful, inter alia, for providing elastomeric seals.

12 Claims, No Drawings

RAPIDLY HARDENING ORGANOPOLYSILOXANE COMPOSITIONS COMPRISING POLYACYLOXYSILANE CROSS-LINKING AGENTS

BACKGROUND OF THE INVENTION

1. Field of the Invention

The present invention relates to organopolysiloxane compositions which are hardenable to elastomers at ambient temperature, and, more especially, to such compositions comprising acyloxy radicals bonded to silicon atoms and further including hardening accelerators which comprise hydroxides of the alkali and alkaline earth metals.

The subject compositions, in contrast to the known one-component compositions also comprising acyloxy radicals bonded to silicon atoms (described, in particular, in French Pat. Nos. 1,198,749, 1,220,348 and 2,429,811, U.S. Pat. No. 3,133,891, and published French Application No. 82/13,505, filed on July 30, 1982), are not stable upon storage, but the time required for the cross-linking thereof is much shorter, for example, on the order of a few minutes up to 60 minutes. They must therefore be directly prepared as and when required.

The subject compositions are also capable of being employed in fields of application which require a short cross-linking time regardless of the degree of humidity of the surrounding atmosphere, such as the production of an "in situ" seal in the automobile industry.

2. Description of the Prior Art

Organopolysiloxane compositions comprising acyloxy radicals bonded to silicon atoms, whose cross-linking time is independent of the humidity of the ambient air are known to this art; compare, for example, British Patent Specification No. 1,308,985. More precisely, this patent relates to a process of hardening consisting of adding to the above compositions from 3 to 15% of a sodium silico-aluminate having from 5 to 15% by weight of adsorbed water.

This prior art process makes it possible to manufacture silicone elastomer molded shaped articles by low pressure injection. However, British Patent Specification No. 1,308,985 teaches that it is necessary to attain relatively short hardening times, for example, on the order of 30 minutes, to introduce large amounts of sodium silico-aluminate (15% in the table on page 2); this has the disadvantage of impairing the mechanical properties of the elastomers produced from the compositions. Furthermore, the patent does not mention the means required to obtain cross-linking times less than 30 minutes. Cf. British Patent Specification Nos. 640,067 and 1,181,346.

Consequently, serious need exists in this art for organopolysiloxane compositions comprising acyloxy radicals bonded to silicon atoms, rapidly hardening at ambient temperature, regardless of air humidity, and still providing elastomers having good mechanical properties.

This combination of properties would make it possible, among other things, to employ such compositions for the gluing or sealing of components;
(1) moving on industrial assembly lines, or
(2) for which no storage areas are available to ensure their complete hardening.

SUMMARY OF THE INVENTION

Accordingly, a major object of the present invention is the provision of an improved organopolysiloxane composition comprising acyloxy radicals bonded to silicon atoms, which improved composition has all of the aforenoted required properties.

Briefly, the subject improved organopolysiloxane compositions comprise a polyhydroxylated polysiloxane, a polyacyloxysilane and a hardening accelerator, said hardening accelerator comprising a hydroxide of an alkali metal or of an alkaline earth metal.

DETAILED DESCRIPTION OF THE INVENTION

More particularly according to the present invention, the subject organopolysiloxane compositions which cross-link to elastomers at ambient temperature, advantageously comprise at least:

(A) 100 parts of by weight polymers which are essentially $\alpha,\omega$-di(hydroxy)diorganopolysiloxanes, having a viscosity of 700 to 1,000,000 mPa.s at 25° C., each consisting of a sequence of recurring diorganosiloxy units of the formula $R_2SiO$ in which the symbols R, which may be identical or different, represent hydrocarbon radicals having from 1 to 8 carbon atoms, optionally substituted by halogen atoms or cyano groups;

(B) 2 to 20 parts by weight of cross-linking agents of the general formula:

in which the symbol R has the meaning given under (A), the symbol R' denotes a hydrocarbon radical free from aliphatic unsaturation, having from 1 to 15 carbon atoms, and the symbol p is zero or one;

(C) 0 to 150 parts by weight of inorganic fillers; and (D) 0.01 to 7 parts by weight, per 100 parts by weight of (A)+(B)+(C), of hardening accelerators, said accelerators (D) comprising the hydroxides of alkali metals or alkaline earth metals.

The hydroxides of alkali metals or alkaline earth metals may either be anhydrous or hydrated. In a preferred embodiment of the present invention, the hydroxides of lithium, barium, strontium or calcium are used, either in an anhydrous or hydrated form.

The polymers (A) having a viscosity of 700 to 1,000,000 mPa.s at 25° C., preferably 1,000 to 700,000 mPa.s at 25° C., are essentially linear polymers, basically consisting of diorganosiloxy units of the aforesaid formula $R_2SiO$, and blocked with a hydroxyl group at each end of their chain; nevertheless, the presence of monoorganosiloxy units of the formula $RSiO_{1.5}$ and/or of siloxy units of the formula $SiO_2$ is not excluded in a proportion of at most 2% relative to the number of diorganosiloxy units.

The hydrocarbon radicals having from 1 to 8 carbon atoms, optionally substituted by halogen atoms or cyano groups and denoted by the symbols R, are advantageously:

(i) alkyl and haloalkyl radicals having from 1 to 8 carbon atoms, such as the methyl, ethyl, n-propyl, isopropyl, n-butyl, n-pentyl, n-hexyl, 2-ethylhexyl, n-octyl, 3,3,3-trifluoropropyl, 4,4,4-trifluorobutyl or 4,4,4,3,3-pentafluorobutyl radicals, (ii) cycloalkyl and halocycloalkyl radicals having from 4 to 8 carbon atoms, such as the cyclopentyl, cyclohexyl, methylcyclohexyl, 2,3-difluorocyclobutyl or 3,4-difluoro-5-methylcycloheptyl radicals, (iii) alkenyl radicals having from 2 to 4 carbon atoms, such as the vinyl, allyl or 2-butenyl radicals, aryl and haloaryl radicals having from 6 to 8 carbon atoms, such as the phenyl, tolyl, xylyl, chlorophenyl, dichlorophenyl or trichlorophenyl radicals, (iv) cyanoalkyl radicals, the alkyl moieties of which have from 2 to 3 carbon atoms, such as the $\beta$-cyanoethyl and $\gamma$-cyanopropyl radicals.

Exemplary of units denoted by the formula $R_2SiO$, the following are representative:

$(CH_3)_2SiO$ $CH_3(CH_2=CH)SiO$ $CH_3(C_6H_5)SiO$ $(C_6H_5)_2SiO$ $CF_3CH_2CH_2(CH_3)SiO$ $NC-CH_2CH_2(CH_3)SiO$ $NC-CH(CH_3)CH_2(CH_2=CH)SiO$ $NC-CH_2CH_2CH_2(C_6H_5)SiO$

It will be appreciated that, in another embodiment of the invention, it is possible to employ as polymers (A) $\alpha,\omega$-di(hydroxy)diorganopolysiloxane copolymers, or a mixture consisting of $\alpha,\omega$-di(hydroxy)diorganopolysiloxane polymers which differ from each other in molecular weight and/or the nature of the groups bonded to the silicon atoms.

Such $\alpha,\omega$-di(hydroxy)diorganopolysiloxane copolymers (A) are readily commercially available; moreover, they can be easily prepared. One of the most widely employed methods of preparation consists, in a first step, of polymerizing diorganocyclopolysiloxanes with the aid of catalytic amounts of alkaline or acid agents and then treating the polymerizates with calculated amounts of water (French Pat. Nos. 1,134,005, 1,198,749 and 1,226,745); this addition of water, which is inversely proportional to the viscosity of the polymers to be prepared, can be wholly or partly replaced with $\alpha,\omega$-di(hydroxy)diorganopolysiloxane oils of a low viscosity, for example, ranging from 5 to 200 mPa.s at 25° C., having a high proportion of hydroxyl radicals, for example, from 3 to 14%.

The cross-linking agents (B) are used in an amount of 2 to 20 parts by weight, preferably of 3 to 15 parts by weight, per 100 parts by weight of the $\alpha,\omega$-di(hydroxy)-diorganopolysiloxane polymers (A). They conform to the aforesaid formula:

$R_pSi(OCOR')_{4-p}$ in which, as heretofore mentioned, the symbol R has the meaning given under (A), the symbol R' denotes a hydrocarbon radical free from aliphatic unsaturation, having from 1 to 15 carbon atoms, and the symbol p is zero or 1.

Precise details have already been given regarding the nature of the radicals denoted by the symbol R. As for the symbol R', this denotes a radical selected from among:

(1) alkyl radicals having from 1 to 15 carbon atoms, such as the methyl, ethyl, n-propyl, n-butyl, n-pentyl, 1-ethylpentyl, n-hexyl, 2-ethylhexyl, n-octyl, neodecyl, n-decyl, n-dodecyl or n-pentadecyl radicals;

(2) cycloalkyl radicals having from 5 to 6 ring carbon atoms, such as the cyclopentyl and cyclohexyl radicals;

(3) aryl radicals having from 6 to 8 carbon atoms, such as the phenyl, tolyl or xylyl radicals.

As examples of cross-linking agents (B), representative are those corresponding to the following formulae:

$CH_3Si(OCOCH_3)_3$ $C_2H_5Si-(OCOCH_3)_3$ $CH_2=CHSi(OCOCH_3)_3$ $C_6H_5Si-(OCOCH_3)_3$ $CH_3Si[OCOCH(C_2H_5)(CH_2)_3-CH_3]_3$ $CF_3CH_2CH_2Si(OCOC_6H_5)_3$ $CH_3Si(OCOC_6H_5)_3$ $CH_3Si(OCOCH_3)_2(OCOCH-(CH_2)_3-CH_3)$
$\qquad\qquad\qquad\qquad\qquad\quad |$
$\qquad\qquad\qquad\qquad\qquad C_2H_5$ $CH_3COOSi[OCOCH-(CH_2)_3CH_3]_3$
$\qquad\qquad\quad\; |$
$\qquad\qquad\; C_2H_5$ It is clear that in the compositions of the invention the components (A) and (B) can be replaced with the devolatilized products emanating from the stoichiometric reaction of (A) with (B) according to the process described in French Pat. No. 1,200,348.

If a cross-linking agent (B) whose acyloxy radicals are of low molecular weight is employed, for example, methyltriacetoxysilane, there is formed, during the cross-linking, an organic acid of low molecular weight, which is generally volatile at the typical cross-linking temperatures and which is removed from the elastomer by evaporation and can then possibly be a source of corrosion phenomena and of loss of adhesion, particularly when the composition is deposited on metallic substrates. On the other hand, if use is made of a cross-linking agent (B) whose acyloxy radicals have a higher molecular weight, for example, methyltris(2-ethylhexanoyloxy)silane, 2-ethylhexanoic acid is formed, which is not volatile at the typical cross-linking temperatures and which remains in the elastomer; this represents a serious disadvantage, since the elastomer then has poor heat resistance and, in particular, a poor CS (compression set).

Furthermore, the acid remaining in the elastomer is also a source of corrosion phenomena and of loss of adhesion, particularly when the composition is deposited on metallic substrates.

One of the highly significant advantages of the use of the accelerators (D) according to the invention is precisely that, on account of their basicity, they neutralize the acids formed over the course of the cross-linking, eliminating the disadvantages inherently associated with the presence of these acids.

It is therefore particularly advantageous to use the accelerator (D) in an amount which is at least stoichiometric relative to the amount of acid which can form during the hardening of the composition.

With these cross-linking agents (B) there may be associated silanes, each of which has only two hydrolyzable groups; these silanes correspond to the formula:

$$R''_2Si(OCOR')_2$$

in which the symbols R' have the meaning of the symbol R' in the formula $$R_pSi(OCOR')_{4-p}$$

and the symbols R'' have the meaning of the symbol R in this same formula, or denote a tertiary butoxy radical of the formula $(CH_3)_3C-O-$.

As examples of these silanes, representative are those of the following formulae:

$$(CH_3)_2Si(OCOCH_3)_2$$

$$CH_2=CH(CH_3)Si(OCOCH_3)_2$$

$$(C_6H_5)_2Si(OCOCH_3)_2$$

$$[(CH_3)_3C-O]_2Si(OCOCH_3)_2$$

$$(CH_3)_2Si[OCOCH(C_2H_5)(CH_2)_3CH_3]_2$$

$$[(CH_3)_3CO]_2Si[OCOCH(C_2H_5)(CH_2)_3CH_3]_2$$

The molar quantity which is employed of the silanes of the formula $$R''_2Si(OCOR')_2$$

relative to the quantity employed of the cross-linking silanes (B) of the formula $R_pSi(OCOR')_{4-p}$ is not narrowly defined, but it is necessary that it has an upper limit such that the mixture of both types of silanes always contains on average at least 2.5 -OCOR' groups per silicon atom.

Thus, when taking, for example, 1 mol of cross-linking silane (B) of the formula $RSi(OCOR')_3$ (with p=1), there must be associated with it at most 1 mol of the silane $R''_2Si(OCOR')_2$; similarly, when taking 1 mol of the cross-linking silane (B) of the formula $Si(OCOR')_4$ (with p=0), there must be associated with it at most 3 mol of silane $R''_2Si(OCOR')_2$.

The main function of the silanes of the formula $R''_2Si(OCOR')_2$ is to link the chains of the α,ω-di(hydroxy)diorganopolysiloxane polymers (A), which makes it possible to obtain elastomers having good physical characteristics starting from compositions containing polymers (A) whose viscosity is relatively low, for example, ranging from 700 to 5,000 mPa.s at 25° C.

The inorganic fillers (C) are employed in an amount of 0 to 150 parts by weight, preferably 5 to 120 parts by weight, per 100 parts by weight of α,ω-di(hydroxy)diorganopolysiloxane polymers (A). These fillers can be in the form of very finely divided particles whose mean particle diameter is less than 0.1 μm. Representative of such fillers are pyrogenic silicas and precipitated silicas; their specific surface is generally greater than 40 m²/g, and is most frequently in the range 150-200 m²/g.

These fillers can also be in the form of more coarsely divided particles, with a mean particle diameter greater than 0.1 μm. Representative of such fillers are ground quartz, diatomaceous silicas, calcium carbonate, calcined clay, rutile-type titanium oxide, the oxides of iron, zinc, chromium, zirconium or magnesium, the various forms of alumina (hydrated or not), boron nitride, lithopone or barium metaborate; their specific surface is generally below 30 m²/g.

The fillers (C) may have been surface-modified by treatment with the various organosilicon compounds conventionally employed for this application. Thus, these organosilicon compounds may be organochlorosilanes, diorganocyclopolysiloxanes, hexaorganodisiloxanes, hexaorganodisilazanes or diorganocyclopolysilazanes (French Pat. Nos. 1,126,884, 1,136,885 and 1,236,505, British Patent Specification No. 1,024,234). The modified fillers contain, in the majority of cases, from 3 to 30% of their weight of organosilicon compounds.

The fillers (C) may consist of a mixture of several types of fillers with different particle size distributions; thus, for example, they may consist of 30 to 70% of finely divided silicas having a specific surface greater than 40 m²/g and of 70 to 30% of more coarsely divided silicas having a specific surface below 30 m²/g.

The hydroxides of alkali metals or alkaline earth metals, which are employed as accelerators (D), are used in an amount of 0.01 to 7 parts by weight, preferably 0.05 to 5 parts by weight, per 100 parts by weight of the sum of the constituents (A), (B) and (C). They are preferably selected from among the hydroxides of lithium, barium, strontium and calcium, in anhydrous or hydrated form. In the anhydrous state these hydroxides correspond to the formulae:

$$LiOH, Ba(OH)_2, Sr(OH)_2, Ca(OH)_2$$

The hydrated hydroxides are represented more especially by the formulae:

$$LiOH \cdot H_2O$$

$$Ba(OH)_2 \cdot H_2O$$

$$Ba(OH)_2 \cdot 8H_2O$$

$$Sr(OH)_2 \cdot H_2O$$

$$Sr(OH)_2 \cdot 8H_2O$$

It should be understood that the amounts of the hydroxides which are employed are based on the weight of the hydroxides proper, no account being taken of any water of crystallization. These hydroxides may be added as such or in the form of pastes, which facilitates their mixing with the other constituents. These pastes may consist of a silicone oil, such as an α,ω-bis(trimethylsiloxy)dimethylpolysiloxane polymer with a variable viscosity ranging, for example, from 500 to 100,000 mPa.s at 25° C. and, if appropriate, one or more inorganic fillers corresponding to at most 15% of the weight of the oil.

To increase the activity of the anhydrous or hydrated hydroxides, water or a compound which releases or evolves water during the cross-linking is preferably added, the water being present at the time of the cross-linking in an amount of at least 0.05% and preferably at least 0.10% relative to the weight of the hydroxides proper; the upper limit is not narrowly defined, but there is no advantage in exceeding 35% of the weight of the hydroxides proper because the excess water could produce, by accelerating the hardening too abruptly, harmful effects on the mechanical properties of the elastomers which are produced. Furthermore, such compositions which harden too quickly would be almost impossible to utilize.

The water may be added at any time during the preparation of the compositions according to the invention; in particular, it may be mixed directly with the hydroxides or with the pastes containing them. If care is taken, or if it is possible to heat the pastes containing, in particular, the hydroxides of lithium, barium or strontium, in the hydrated form, to a temperature above 100° C., for example, ranging from 100° to 180° C., for at least 30 minutes, then, very often, a part or all of the water of hydration is released. This water, dispersed in the paste, behaves like added water and further addition may therefore be found unnecessary.

The organopolysiloxane compositions according to the invention may contain, in addition to the constituents (A), (B), (C) and (D), hardening catalysts which are typically selected from among:

(i) metal salts of carboxylic acids, preferably organotin salts of carboxylic acids, such as dibutyltin diacetate and dilaurate, (ii) products of reaction of organotin salts of carboxylic acids with titanic acid esters (U.S. Pat. No. 3,409,753), (iii) organic derivatives of titanium and of zirconium, such as the titanic and zirconic acid esters (published French Application No. 82/13,505, filed July 30, 1982).

These catalysts for hardening are typically employed in a proportion from 0.0004 to 6 parts by weight, preferably from 0.0008 to 5 parts by weight, per 100 parts by weight of $\alpha,\omega$-di(hydroxy)diorganopolysiloxane polymers (A).

The organopolysiloxane compositions may also contain the usual adjuvants and additives, including, in particular, heat stabilizers. These latter materials, which, through their presence, improve the heat resistance of the silicone elastomers, may be selected from the salts, oxides and hydroxides of rare earths (and more especially from the ceric oxides and hydroxides) or from the oxides of titanium and of iron obtained, preferably, by combustion.

Advantageously, the compositions according to the invention contain from 0.1 to 15 parts by weight, and preferably from 0.15 to 12 parts by weight, of heat stabilizers per 100 parts by weight of $\alpha,\omega$-di(hydroxy)-diorganopolysiloxane polymers (A).

As other additives, exemplary are compounds improving flame resistance; these are preferably selected from among organic phosphorus derivatives, organic halogen compounds, and organic and inorganic platinum derivatives.

In addition to the main constituents (A), (B), (C) and (D) and the above-mentioned additives, particular organopolysiloxane compounds may be introduced with the intention of influencing the physical characteristics of the compositions according to the invention and/or the mechanical properties of the elastomers produced by the hardening of these compositions.

These organopolysiloxane compounds are well known; they include, more especially:

(1f) $\alpha,\omega$-bis(triorganosiloxy)diorganopolysiloxane and/or $\alpha$-(hydroxy)-$\omega$-(triorganosiloxy)diorganopolysiloxane polymers, having viscosities of at least 10 mPa.s at 25° C., consisting essentially of diorganosiloxy units and at most 1% of monoorganosiloxy and/or siloxy units, the organic radicals bonded to the silicon atoms comprising methyl, vinyl or phenyl radicals, at least 60% of these organic radicals being methyl radicals and at most 10% being vinyl radicals. The viscosity of these polymers may reach several tens of millions of mPa.s at 25° C.; they therefore include oils with a fluid to viscous appearance and soft to hard gums. They are prepared according to the conventional techniques described in greater detail in French Pat. Nos. 978,058, 1,025,150, 1,108,764 and 1,370,884. Preferably use is made of $\alpha,\omega$-bis(trimethylxiloxy)dimethylpolysiloxane oils having a viscosity ranging from 10 mPa.s to 1,000 mPa.s at 25° C. These polymers, which act as plasticizers, may be added in an amount of at most 150 parts by weight, preferably of 5 to 120 parts by weight, per 100 parts by weight of $\alpha,\omega$-di(hydroxy)diorganopolysiloxane polymers (A).

(2f) branched, liquid methylpolysiloxane polymers having from 1.4 to 1.9 methyl radicals per silicon atom, consisting of a combination of units of the formulae:

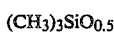

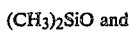

and containing from 0.1 to 8% of hydroxyl groups. Same can be obtained by hydrolysis of the corresponding chlorosilanes as taught by French Pat. Nos. 1,408,662 and 2,429,811. Preferably, use is made of branched polymers whose units are distributed according to the following ratios:

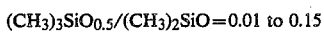

and

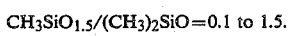

These polymers may be added in an amount of at most 70 parts by weight, preferably of 3 to 50 parts by weight, per 100 parts by weight of $\alpha,\omega$-di(hydroxy)diorganopolysiloxane polymers (A). They confer thixotropic properties, particularly with the modified silicas.

(3f) diorganopolysiloxane oils blocked with hydroxyl groups and/or lower alkoxy groups having from 1 to 4 carbon atoms, having a low viscosity generally in the range 2 mPa.s to 4,000 mPa.s at 25° C. (if these oils are blocked only with hydroxyl groups, their viscosity is below 700 mPa.s at 25° C.); the organic radicals bonded to the silicon atoms of these oils are, as before, selected from among the methyl, vinyl or phenyl radicals, at least 40% of these radicals being methyl radicals and at most 10% being vinyl radicals. As chain-blocking lower alkoxy groups, exemplary are the methoxy, ethoxy, isopropoxy, n-propoxy, n-butoxy, isobutoxy and tertiary butoxy groups. The contents of hydroxyl and/or alkoxy groups generally range from 0.5 to 20%. These oils are prepared according to conventional techniques described in greater detail in French Pat. Nos. 938,292, 1,104,674, 1,116,196, 1,278,281 and 1,276,619. Preferably, $\alpha,\omega$-dihydroxydimethylpolysiloxane oils are used, having a viscosity of 10 to 300 mPa.s at 25° C., or $\alpha,\omega$-dihydroxymethylphenylpolysiloxane oils are used, having a viscosity of 200 to 600 mPa.s at 25° C., or $\alpha,\omega$-dimethoxy(or diethoxy)dimethylpolysiloxane oils are used, having a viscosity of 30 to 2,000 mPa.s at 25° C. They may be added in a proportion of at most 50 parts by weight, preferably of 2 to 40 parts by weight, per 100 parts by weight of α,ω-di(hydroxy)diorganopolysiloxane polymers (A). These oils make it possible to reduce the overall viscosity and are considered, according to the conventional term, as process aids.

(4f) hydroxylated organosilicon compounds selected from among compounds corresponding to the general formula:

Z'SiZ$_2$(OSiZ$_2$)$_w$OH, which are solid at ambient temperature. In this formula, the symbols Z, which may be identical or different, denote methyl, ethyl, n-propyl, vinyl or phenyl radicals; the symbol Z' denotes a hydroxyl radical or Z, and the symbol w is zero, 1 or 2. As specific examples of these compounds, representative are: diphenylsilanediol, methylphenylsilanediol, dimethylphenylsilanol, 1,1,3,3-tetramethyldisiloxanediol, 1,3-dimethyl-1,3-diphenyldisiloxanediol or 1,1,5,5-tetramethyl-3,3-diphenyltrisiloxanediol. They may be added in a proportion of at most 30 parts by weight, preferably 0.5 to 20 parts by weight, per 100 parts by weight of α,ω-di(hydroxy)diorganopolysiloxane polymers (A). Same confer thixotropic properties on the medium, which generally is slightly gelled by their action. The α,ω-bis(triorganosiloxy)diorganopolysiloxane and/or α-(hydroxy)-ω-(triorganosiloxy)diorganopolysiloxane polymers described under (1f) may be replaced, wholly or partially, with organic compounds which are unreactive towards the constituents (A), (B), (C) and (D) and which are miscible at least with the α,ω-di(hydroxy)diorganopolysiloxane polymers (A). Exemplary of such organic compounds, representative are the polyalkylbenzenes obtained by alkylation of benzene with long-chain olefins, particularly olefins with 12 carbon atoms emanating from the polymerization of propylene. Organic compounds of this type appear, for example, in French Pat. Nos. 2,392,476 and 2,446,849.

The compositions according to the invention may, if appropriate, be used after dilution with liquid organic compounds, the diluents preferably being conventional commercially available materials selected from among:

(i) optionally halogenated, aliphatic, cycloaliphatic or aromatic hydrocarbons, such as n-heptane, n-octane, cyclohexane, methylcyclohexane, toluene, xylene, mesitylene, cumene, tetralin, perchloroethylene, trichloroethane, tetrachloroethane, chlorobenzene or ortho-dichlorobenzene;

(ii) aliphatic and cycloaliphatic ketones, such as methyl ethyl ketone, methyl isobutyl ketone, cyclohexanone or isophorone;

(iii) esters, such as ethyl acetate, butyl acetate or ethylglycol acetate.

The amount of diluent is generally of little significance, generally being below 50%.

The preparation of the compositions according to the invention can take place in a single step, by mixing in a suitable reactor the combination of the components (A), (B), (C) and (D) and, if appropriate, the above-mentioned additives and adjuvants. These compounds may be added to the reactor in any order but it is, nevertheless, preferable to add the accelerators (D) after adding all of the other compounds such as to avoid a premature hardening of the mixture.

The preparation of the compositions can also take place in 2 steps. According to this technique, which is another object of the present invention, one-component compositions are first prepared by mixing, in the absence of moisture, the constituents (A), (B) and (C) and, if appropriate, the conventional additives and adjuvants. Same are stable on storage and harden only on exposure to moist air. Naturally, such compositions could, if appropriate, be employed alone and their hardening or cross-linking would then develop commencing from the surfaces in contact with the surrounding air and proceed progressively towards the interior of the mixture. The time for their complete hardening would be relatively long and would depend chiefly on the thickness of the deposited layers and on the humidity of the atmosphere surrounding the compositions. Generally, a period of 24 hours would thus be required at ambient temperature, with a humidity of 60%, to cross-link properly a layer 4 mm in thickness.

In a second step, the hardening accelerators (D) are added to these one-component compositions, and homogenized therewith, at the time of use. The compositions obtained, according to the invention, must be used quickly, since their hardening, in contrast to that of one-component compositions, develops essentially uniformly throughout the mixture. The time for their complete hardening is very variable, given that it depends on the nature and on the quantities of the accelerators (D) employed, on the presence or absence of water and on the form in which this water is introduced. By varying these various parameters it is possible to obtain hardening times ranging from a few minutes to 60 minutes or longer. The temperature is also an important parameter; in fact, variations in the temperature level have a very marked effect on the rate of hardening. If the temperature increases (the variations are positive) the hardening time is shortened; in the reverse case, such time is lengthened.

Thus, reductions in hardening time of one half, and sometimes much more, may be obtained by exposing the compositions to temperatures ranging, for example, from 50° to 200° C. instead of maintaining them at ambient temperature, namely, in the range of 15°–25° C.

Another object of the present invention is the use of the compositions with rapid hardening to produce seals.

The compositions according to the invention may be employed for many applications such as sealing in the building industry, the assembly of the most diverse materials (metals, plastics, natural and synthetic rubbers, wood, cardboard, crockery, brick, ceramics, glass, stone, concrete, masonry components), the insulation of electrical conductors, the coating of electronic circuits, or the preparation of molds employed in the manufacture of objects from synthetic resins or foams.

Furthermore, they are more especially suitable for the production of "in situ" seals employed in the automobile industry. These "in situ" seals encompass several types, namely, "crushed" seals, "formed" seals and "injected" seals.

The "crushed" seals are formed following the application of a pasty ribbon of the compositions to the zone of contact between 2 metal components to be assembled. The pasty ribbon is first deposited on one of the components and then the other component is immediately applied to the first; this results in a crushing of the ribbon before it is converted into elastomer. This type of seal is applicable to assemblies which usually do not need to be taken apart (oil sump seals, engine front end cover seals, etc.).

The "formed" seals are also obtained following the application of a pasty ribbon of the compositions to the zone of contact between 2 components to be assembled. However, after the deposition of the pasty ribbon on one of the components it is necessary to wait for the complete hardening of the ribbon to elastomer and the second component is applied to the first only after this time. As a result such an assembly can be easily taken apart since the component which is applied to that which has received the seal does not adhere to this seal. Furthermore, the seal, by virtue of its rubbery nature, adapts to all the irregularities of the surfaces to be sealed and, for this reason, there is no need (1) to machine carefully the metal surfaces which are to be placed in contact with each other and (2) to clamp under pressure the assemblies which are obtained; these factors make it possible to eliminate, to some extent, fixing seals, spacers, or ribs which are usually intended to stiffen and strengthen the components of the assemblies.

Since the compositions according to the invention harden quickly at ambient temperature, in the presence or the absence of moisture, in an enclosed environment or in free air, it follows that the "formed" seals (and also the other "in situ" seals) resulting from the hardening of these compositions can be produced under highly restricting conditions. They may, for example, be produced on the conventional assembly lines in the automobile industry which are equipped with an automatic apparatus for depositing the compositions. This automatic apparatus very frequently has a mixer head equipped with a deposition nozzle, the latter moving along the outline of the seals to be produced. The mixing head can receive the one-component polysiloxane composition and the accelerator, and can also have a third inlet allowing the introduction of a solvent for washing the equipment after use (cyclohexane, etc.).

The compositions produced and distributed by means of this apparatus must have a closely controlled hardening time, on the one hand to avoid solidification in the mixer head and on the other hand to obtain a complete cross-linking after the application of the pasty ribbon to the parts to be sealed. These "formed" seals are more especially suitable for the seals of rocker covers, gearbox covers, timing covers and even oil sumps, etc.

The injected seals are formed in an enclosed environment, often in cavities which are completely closed; the compositions placed in these cavities are rapidly converted into elastomers whose properties are identical to those of elastomers resulting from hardening of the compositions in free air. These seals can ensure, for example, the sealing of crankshaft bearings.

The compositions according to the invention are also suitable for the production of quick-hardening seals in areas other than automotive. They can thus serve to glue and to seal electrical switch boxes made of plastic, and to produce seals for vacuum cleaners and for steam irons.

The elastomers formed by the hardening of the compositions according to the invention have mechanical properties which are identical to those of elastomers produced from known one-component compositions, namely, the compositions formed by simple mixing of the constituents (A), (B) and (C) and, if appropriate, of conventional additives without the addition of accelerators (D). In particular, the compression sets are relatively low, for example, on the order of 8 to 35%; furthermore, the complete cross-linking measured by the Shore A hardness is obtained immediately following the cross-linking times mentioned earlier, which generally last from a few minutes to 60 minutes, sometimes longer but never more than 3 hours. In the case of one-component compositions, the complete cross-linking requires, under the most favorable of conditions, at least 10 hours or thereabouts. Furthermore, straightforward addition of water to the one-component compositions, while accelerating the hardening process appreciably, does not permit same to be cross-linked properly; in general, the final Shore A hardness is from 15 to 40% lower than that obtained without water or with the accelerator (D).

In order to further illustrate the present invention and the advantages thereof, the following specific examples are given, it being understood that same are intended only as illustrative and in nowise limitative.

EXAMPLE 1

A composition $C_1$ which hardens to an elastomer at ambient temperature was prepared by mixing the following constituents:

(1) 100 parts by weight of an $\alpha,\omega$-di(hydroxy)dimethylpolysiloxane oil having a viscosity of 4,000 mPa.s at 25° C.;

(2) 20 parts by weight of a pyrogenic silica having a specific surface of 200 m$^2$/g;

(3) 20 parts by weight of ground quartz having a mean particle diameter of 5 microns;

(4) 20 parts by weight of rutile-type titanium dioxide having a mean particle diameter of 8 microns;

(5) 1 part by weight of an $\alpha,\omega$-di(hydroxy)methylphenylpolysiloxane oil having a viscosity of 350 mPa.s at 25° C.; and (6) 6 parts by weight of methyl(triacetoxy)silane.

This composition $C_1$ was dispersed in 72 parts of anhydrous cyclohexane. A homogeneous dispersion $D_1$ was thus obtained, containing approximately 70% of the composition $C_1$. This dispersion was stored in moistureproof aluminum containers; it displayed no change in appearance after 6 months storage.

In addition, 7 pastes were prepared, each containing a hardening accelerator for the composition $C_1$. The nature of the components, together with the quantities employed, expressed in % by weight, of these pastes, are reported in the following Table I:

TABLE I

| CONSTITUENTS OF EACH PASTE | $A_1$ | $A_2$ | $A_3$ | $A_4$ | $A_5$ | $A_6$ | $A_7$ |
|---|---|---|---|---|---|---|---|
| $\alpha,\omega$-bis(trimethylsiloxy)-dimethylpolysiloxane oil having a viscosity of 30,000 mPa·s at 25° C. | 69.8 | 79.7 | 71.8 | 68.9 | 64.3 | 78.1 | 89.4 |
| Pyrogenic silica having a specific surface of 200 m$^2$/g | 0.8 | 0.9 | 0.8 | 0.8 | 0.7 | 3.1 | 5.3 |
| Ca(OH)$_2$ (accelerator) | 28.8 | 19.1 | 27.1 | 30.1 | 35 | | |
| LiOH.H$_2$O (accelerator) | | | | | | | 5 (or 2.85 of LiOH) |
| Ba(OH)$_2$.8H$_2$O (accelerator) | | | | | | 18.8 (or 0.2 | |

TABLE I-continued

| CONSTITUENTS OF EACH PASTE | $A_1$ | $A_2$ | $A_3$ | $A_4$ | $A_5$ | $A_6$ | $A_7$ |
|---|---|---|---|---|---|---|---|
| Added water | | 0.60 | 0.3 | 0.3 | 0.2 | 0 of Ba(OH)$_2$ 0 | 0.3 |

10 g of one of the 7 pastes were first introduced into a cylindrical plastic container, 500 cm$^3$ in volume, followed by 200 g of the dispersion D$_1$; the contents of the container were immediately mixed with a spatula and this mixing was continued for approximately 1 minute, 15 seconds; the mixture was then quickly poured into a cylindrical glass flask, 125 cm$^3$ in volume, equipped with a cover pierced by 2 holes, one of the holes allowing the passage of a stream of dry nitrogen, the other serving for the passage of a No. 7 spindle of a Brookfield viscometer.

After closing the cover, installing the viscometer spindle and connecting the supply for a stream of dry nitrogen, the viscometer spindle was started and rotated at the rate of 2.5 rpm. The time interval between the start of mixing with the spatula and the start of the rotation of the viscometer spindle was 2 minutes.

The change in the viscosity of the mixture contained in the glass flask was traced as a function of time and the rotation of the spindle was terminated when the viscometer still showed a reading indicating a viscosity of 16.10$^5$ mPa.s at 25° C.

TABLE II

| PASTES ADDED TO THE DISPERSION D$_1$ | $A_1$ | $A_2$ | $A_3$ | $A_4$ | $A_5$ | $A_6$ | $A_7$ |
|---|---|---|---|---|---|---|---|
| Quantity of the accelerator in % of the composition C$_1$ | 2.05 | 1.36 | 1.93 | 2.15 | 2.5 | 0.73 | 0.20 |
| Quantity of added water in % of the accelerator | 2.08 | 1.57 | 1.1 | 0.66 | 0 | 0 | 10.52 |
| Time to reach 16 · 10$^5$ mPa · s at 25° C. | 19 min 30 sec | 45 min | 20 min 30 sec | 45 min | 85 min | 10 min | 11 min |

It was found that the change in the viscosity in the body of the mixture was distinct in all cases. It varied, however, as a function of the nature of the accelerator and of the quantity which was used, as well as of the quantity of water added.

EXAMPLE 2

A paste was prepared by mixing:
(i) 100 parts by weight of an α,ω-bis(trimethylsiloxy)-dimethylpolysiloxane oil having a viscosity of 30,000 mPa.s at 25° C.;
(ii) 2 parts by weight of a pyrogenic silica having a specific surface of 200 m$^2$/g; and
(iii) 17.6 parts by weight of lime of the formula Ca(OH)$_2$ having a mean particle diameter of 6 μm.

5 parts of this paste (corresponding to 0.73 part of lime) were blended into 100 parts of the composition C$_2$, itself obtained by mixing the following constituents:
(1) 100 parts by weight of an α,ω-di(hydroxy)dimethylpolysiloxane oil having a viscosity of 7,000 mPa.s at 25° C.;
(2) 10 parts by weight of a pyrogenic silica having a specific surface of 150 m$^2$/g;
(3) 85 parts by weight of a diatomaceous silica having a mean particle diameter of 5 microns;
(4) 4 parts by weight of an α,ω-di(hydroxy)dimethylpolysiloxane oil having a viscosity of 50 mPa.s at 25° C.;
(5) 5 parts by weight of methyltriacetoxysilane; and
(6) 0.004 part by weight of butyl titanate.

The period of blending of the paste with the composition C$_2$ was approximately 2 minutes. The composition obtained was immediately spread out in the form of a layer 4 mm thick on polyethylene plates arranged in 3 batches.

One batch of plates was placed in an enclosure heated to a temperature of 25° C., another batch in an enclosure heated to a temperature of 50° C. and the third batch in an enclosure heated to a temperature of 100° C.

The layer of the composition deposited on each plate was converted into a rubbery strip whose Shore A hardness was determined as a function of time. The time was measured from the moment when the plates were placed into the heated enclosures. The results are as follows:

Plates exposed to a temperature of 25° C.

The Shore A hardness was measurable after 25 minutes and reached its maximum value of approximately 50 after 90 minutes.

Plates exposed to a temperature of 50° C.

The Shore A hardness was measurable after 10 minutes and reached its maximum value after 60 minutes.

Plates exposed to a temperature of 100° C.

The Shore A hardness was measurable after 5 minutes and reached its maximum value after 20 minutes.

These results evidence that, for a specified composition, a wide range of vulcanization times is available depending on the temperature.

Furthermore, the composition C$_2$ was stored in a moistureproof container. It displayed no signs of change after 1 year's storage.

EXAMPLE 3

A composition which hardens at ambient temperature was prepared by mixing the following constituents:
(1) 100 parts by weight of an α,ω-di(hhydroxy)dimethylpolysiloxane oil having a viscosity of 3,500 mPa.s at 25° C.;
(2) 14 parts by weight of a pyrogenic silica having a specific surface of 200 m$^2$/g;
(3) 14 parts by weight of diatomaceous silica having a mean particle diameter of 5 microns; and
(4) 1.65 parts by weight of rutile-type titanium dioxide having a particle diameter of 8 microns.

The traces of water were removed by heating at 120° C. under slightly reduced pressure and, after cooling, 10 parts by weight of methyltris(2-ethylhexanoyloxy)silane were added thereto.

To this composition were added:

(5) 30 parts by weight of an α,ω-bis(trimethylsiloxy)-dimethylpolysiloxane oil having a viscosity of 20 mPa.s at 25° C., and the composition was divided into 4 portions of 100 g. 2.40, 3.60 and 4.80 g of lime of the formula Ca(OH)$_2$ having a mean particle diameter of 6 μm were added, respectively, to three of these portions. 3 compositions designated D$_1$, D$_2$ and D$_3$ were thus obtained and the fourth portion without lime was designated C$_2$.

The compositions C$_2$, D$_1$, D$_2$ and D$_3$ were immediately spread out in the form of a layer 2 mm in thickness on polyethylene plates and the time required to permit manual separation and complete removal of the layer of elastomer from the polyethylene plate was then measured. After the elastomer had been permitted to cross-link for 5 days under ambient conditions and once it had hardened, the 2-ethylhexanoic acid contained in the elastomer and formed by hydrolysis of the methyltris(2-ethylhexanoyloxy)silane employed as cross-linking agent was extracted with toluene. n-Butanol was added to the extract to give a 50/50 mixture by volume of toluene and butanol, and then a colored indicator reflecting the presence of acidity was added.

A determination of the number of millimoles of 2-ethylhexanoic acid extracted with the toluene per 100 g of elastomer C$_2$, D$_1$, D$_2$ and D$_3$ can be carried out by titration with alcoholic potassium hydroxide. The results obtained for the separation times and the quantity of acid remaining in the elastomer are reported in the following Table III:

TABLE III

| Nature of the composition converted to elastomer | Speed of cross-linking | Time to separate the elastomer layer | Quantity of 2-ethylhexanoic acid in millimoles in 100 g of elastomer |
|---|---|---|---|
| C$_2$ with 0 g Ca(OH)$_2$ | Slow setting starting from the surface | 24 hours | 39 |
| D$_1$ with 2.4 g of Ca(OH)$_2$ per 100 g of D$_1$ | Fast setting throughout the mass | 30 minutes | 7.7 |
| D$_2$ with 3.60 g of Ca(OH)$_2$ per 100 g of D$_2$ | Fast setting throughout the mass | 15 minutes | Traces |
| D$_3$ with 4.80 g of Ca(OH)$_2$ per 100 g of D$_3$ | Fast setting throughout the mass | 15 minutes | 0 |

The above Table evidences that the presence of lime makes it possible to obtain a very fast setting of the composition and to neutralize the 2-ethylhexanoic acid.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An organopolysiloxane composition comprising (A) 100 parts by weight of essentially α,ω-di(hydroxy)-diorganopolysiloxane polymers having a viscosity of 700 to 1,000,000 mPa.s at 25° C., and which polymers comprise recurring diorganosiloxy units of the formula R$_2$SiO, in which the symbols R, which may be identical or different, are hydrocarbon radicals having from 1 to 8 carbon atoms, or halo or cyano substituted such radicals; (B) 2 to 20 parts by weight of a polyacycloxysilane cross-linking agent of the general formula R$_p$Si(OCOR')$_{4-p}$ in which R is as defined above, R' is a hydrocarbon radical devoid of aliphatic unsaturation and having from 1 to 15 carbon atoms, and p ranges from zero to 1; (C) 0 to 150 parts by weight of inorganic filler material; and (D) 0.01 to 7 parts by weight, per 100 parts by weight of (A)+(B)+(C), of a hardening accelerator which comprises an alkali or alkaline earth metal hydroxide.

2. The organopolysiloxane composition as defined by claim 1, said hardening accelerator (D) comprising lithium, barium, strontium or calcium hydroxide, in anhydrous or hydrated state.

3. The organopolysiloxane composition as defined by claim 1, further comprising (E) water, in an amount such that during the cross-linking thereof the water concentration ranges from 0.05% to 35% relative to the anhydrous hydroxides (D).

4. The organopolysiloxane composition as defined by claim 1, in which the radicals R bonded to the silicon atoms of the dihydroxylated organopolysiloxane are alkyl or haloalkyl radicals having from 1 to 8 carbon atoms, cycloalkyl or halocycloalkyl radicals having from 4 to 8 carbon atoms, alkenyl radicals having from 2 to 4 carbon atoms, aryl and haloaryl radicals having from 6 to 8 carbon atoms, or cyanoalkyl radicals, the alkyl moieties of which having from 2 to 3 carbon atoms.

5. The organopolysiloxane composition as defined by claim 1, wherein the polyacyloxysilane, p ranges from zero to 1, an the radicals R' are alkyl radicals having from 1 to 15 carbon atoms, cycloalkyl radicals having from 5 to 6 ring carbon atoms, or aryl radicals having from 6 to 8 carbon atoms.

6. The organopolysiloxane composition as defined by claim 1, comprising a stoichiometric amount of the hardening accelerator (D) relative to the amount of acid adapted to be formed during the hardening thereof.

7. The organopolysiloxane composition as defined by claim 1, comprising from 5 to 120 parts by weight of the inorganic filler material (C).

8. The organopolysiloxane composition as defined by claim 1, further comprising a hardening catalyst.

9. The organopolysiloxane composition as defined by claim 1, in elastomeric hardened, cross-linked state.

10. A shaped article comprising the elastomeric organopolysiloxane as defined by claim 9.

11. A seal comprising the elastomeric organopolysiloxane as defined by claim 9.

12. An organopolysiloxane composition comprising (A) 100 parts by weight of essentially α,ω-di(hydroxy)- diorganopolysiloxane polymers having a viscosity of 700 to 1,000,000 mPa.s at 25° C., and which polymers comprise recurring diorganosiloxy units of the formula $R_2SiO$, in which the symbols R, which may be identical or different, are hydrocarbon radicals having from 1 to 8 carbon atoms, or halo or cyano substituted such radicals; (B) 2 to 20 parts by weight of a polyacyloxysilane cross-linking agent of the general formula $R_pSi(OCOR')_{4-p}$ in which R is as defined above, R' is a hydrocarbon radical devoid of aliphatic unsaturation and having from 1 to 15 carbon atoms, and p is zero or one; (C) 0 to 150 parts by weight of inorganic filler material; and (D) 0.01 to 7 parts by weight, per 100 parts by weight of (A)+(B)+(C), of a hardening accelerator which comprises an alkali or alkaline earth metal hydroxide, the components (A) and (B) comprising the devolatilized reaction product resulting from the stoichiometric reaction therebetween.

* * * * *